March 4, 1924.
A. T. BURNETT
1,485,367
CANDY RUNNING IMPLEMENT
Filed Oct. 4, 1922
2 Sheets-Sheet 2
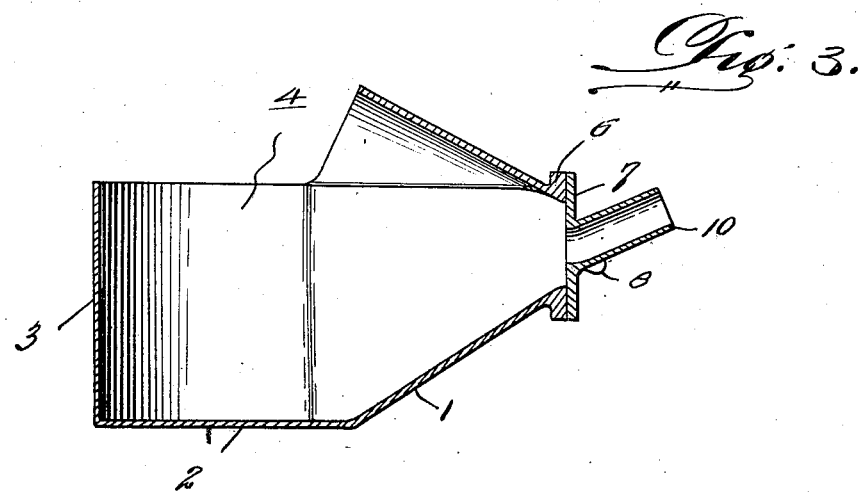
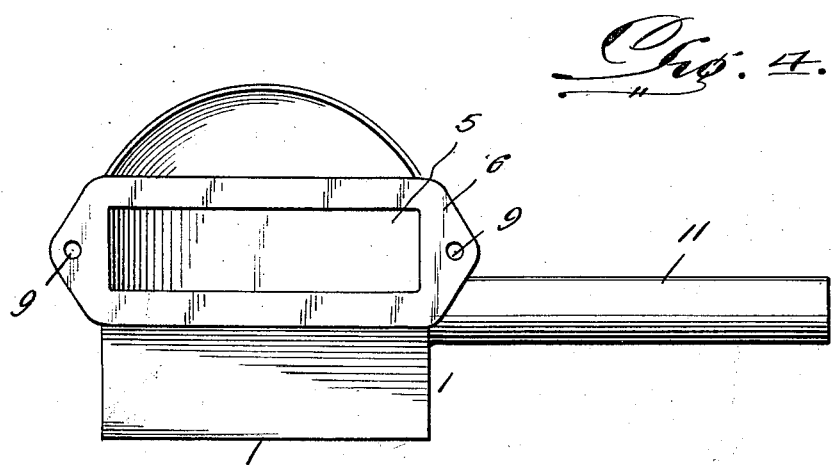
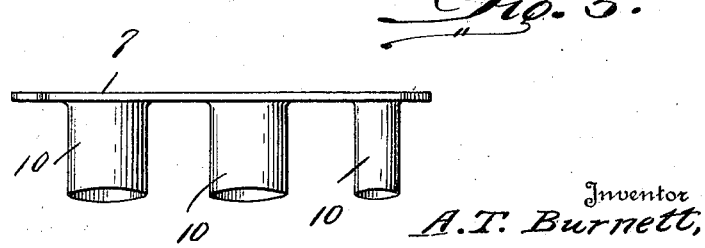
Inventor
A. T. Burnett,
By Clarence A. O'Brien
Attorney
Witnesses:

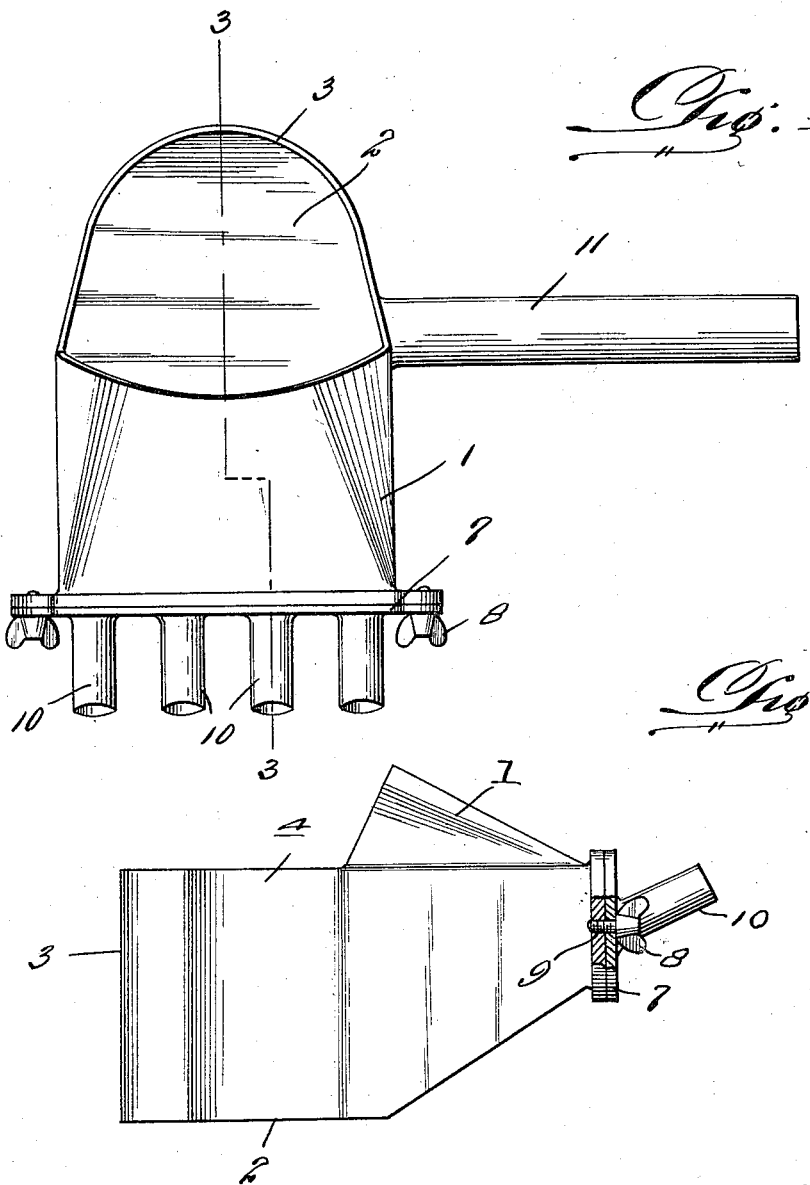

Patented Mar. 4, 1924.

1,485,367

UNITED STATES PATENT OFFICE.

ALBERT T. BURNETT, OF LOS ANGELES, CALIFORNIA.

CANDY-RUNNING IMPLEMENT.

Application filed October 4, 1922. Serial No. 592,336.

*To all whom it may concern:*

Be it known that I, ALBERT T. BURNETT, a citizen of the United States, residing at Los Angeles, in the county of Los Angeles and State of California, have invented new and useful Improvements in Candy-Running Implements, of which the following is a specification.

In carrying out the present invention it is my purpose to provide a candy running implement wherein the spouts through which the candy in a liquid or semi-liquid condition passes may be readily and quickly removed from the forward portion of the hopper or container when it is desired to change the size or the spouts, thereby enabling the candy to be run in streams of the desired thickness.

It is also my purpose to provide a device of the class described which will embrace the desired features of simplicity, efficiency and durability which may be manufactured and marketed at small cost and which will embody comparatively few parts and this so arranged and correlated as to reduce the possibility of derangement to a minimum.

With the above recited objects in view and others of similar nature the invention resides in the construction, combination and arrangement of parts hereinafter set forth in and falling within the scope of the appended claim.

In the accompanying drawings:—

Figure 1 is a plan view of a candy running implement constructed in accordance with my invention.

Figure 2 is a view of the side elevation of the same.

Figure 3 is a sectional view on the line 3—3 of Figure 1.

Figure 4 is a front elevation of the implement with the spouts omitted.

Figure 5 is a view elevation showing a modified form of the spout removed.

20 indicates a container having a bottom 2 formed with an inclined forward end portion, parallel side walls extending from the bottom and connected by a curved rear wall 3, and an inclined top wall at the forward end of said side walls, so that an opening 4 is provided in the rear portion of the container so that it may receive a batch of material to be subsequently poured from the opening 5 in the forward end thereof.

In accordance with my invention the forward end of the container 1 is formed to provide an opening 5 at the top side thereof and the walls of the opening 5 are formed with outwardly extending flanges 6. 7 designates a plate adapted to close the opening 5 and when the plate 7 is arranged across the opening 5 the marginal edges of the plate are in face to face contact with the flanges 6. This plate 7 is detachably connected to the forward end of the container 1 by means of thumb screws 8 that are carried by the ends of the plate 7 and are designed to threadedly engage openings 9 formed in the end flanges 6. The plate 7 is formed with forwardly and upwardly extending spouts 10 spaced apart at appropriate distances and through which the candy is run. These spouts 10 may be of the same diameter or of different diameters as shown in Figure 5 of the drawings according as it is desired to vary the diameters or thicknesses of the streams of candy being run.

By means of the plate 7 carrying the spouts 10 and the detachable connections between the plate 7 and the forward end of the hopper-like container it will be seen that the plates carrying spouts of various sizes which may be interchangeably connected with the container so that streams of candy of the desired thickness and shape may be poured.

The body is also provided with a handle 11 so that the device as an entirety may be readily and conveniently handled and manipulated.

The forward portion of the bottom 2 is inclined upwardly as clearly indicated at Figure 2, to the forward end terminating in the opening 5 and flange 6 which is at the top portion of the side of the body and the top wall 1 is curved outwardly with respect to the top of the side walls as clearly indicated in Figures 2 and 3, so that the body may have the rear end walls 3 turned downwardly and dipped into a pot containing candy for dipping a container full of candy to be subsequently poured through the spout 10. After the candy is dipped up in this manner, the container is held in a horizontal position as shown in Figure 2, until the operator is ready to pour the same, at which time the body is rotated so that the spouts project downwardly and the chocolate will run down the inclined portion of the bottom out through the spout, the top wall 1 preventing the chocolate from spilling out of the container. It is also to be noted that the spouts 1 in the position shown in Figure 2 project upwardly at an incline substantially the same as that of the inclined bottom wall of the container, so that the container may be substantially filled with chocolate and held in the position shown in Figure 2 without having the chocolate overflow the sides thereof or run out through the spouts 10. In addition, the spouts 10 and plates 7 may be easily changed for other and different sizes of spouts while the container is still partially full of chocolate yet to be poured, so that one container full of chocolate may be dipped from a receptacle and several different spouts used, one after the other for producing various effects upon an article to be decorated with the chocolate.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters-Patent, is:—

A candy pouring implement including a body having a bottom, side walls, a curved top wall on the front portion thereof, and a curved rear end wall, said top and rear end walls defining an opening in the rear of the body with the upper edges of the side walls for receiving material to be poured, the forward end of the bottom being upwardly inclined, the forward end of the body having a substantially narrow opening extending across said body, an annular flange extending therefrom, a handle extending laterally from one side of the body, a spout member having an annular flange for fitting the flange on the body, and means for removably securing said spout member on the body, the spout of said member being inclined upwardly with relation to the body so that the upper end thereof terminates in the plane of the upper edge of the side walls whereby the rear end of the body may be dipped into a receptacle containing candy for receiving a charge therein, said body being adapted to hold the charge until it is desired to be poured by moving the forward end of the container downwardly so that the charge will run down the inclined wall of the bottom and out through the spout.

In testimony whereof, I affix my signature.

ALBERT T. BURNETT.

Witness:
LIDA BURNETT.